United States Patent [19]
Nelle

[11] Patent Number: 4,509,262
[45] Date of Patent: Apr. 9, 1985

[54] MOUNTING ARRANGEMENT FOR LENGTH MEASURING DEVICE

[75] Inventor: Guenther Nelle, Bergen, Fed. Rep. of Germany

[73] Assignee: Dr. Johannes Heidenhain GmbH, Traunreut, Fed. Rep. of Germany

[21] Appl. No.: 572,166

[22] Filed: Jan. 18, 1984

[30] Foreign Application Priority Data

Jan. 27, 1983 [DE] Fed. Rep. of Germany ....... 3302643

[51] Int. Cl.³ .............................................. G01B 11/04
[52] U.S. Cl. ................................. 33/125 R; 33/125 A
[58] Field of Search ............. 33/125 R, 125 C, 125 A, 33/125 T

[56] References Cited

U.S. PATENT DOCUMENTS

| 4,070,759 | 1/1978 | Nelle | 33/125 C |
| 4,169,316 | 10/1979 | Ernst | 33/125 R |
| 4,184,262 | 1/1980 | Kolb et al. | 33/125 R |
| 4,198,757 | 4/1980 | Nelle | 33/125 C |
| 4,413,416 | 11/1983 | Ernst | 33/125 R |

FOREIGN PATENT DOCUMENTS

| 2505585 | 6/1978 | Fed. Rep. of Germany . |
| 2712422 | 11/1978 | Fed. Rep. of Germany . |
| 2630880 | 12/1978 | Fed. Rep. of Germany . |
| 3008384 | 9/1981 | Fed. Rep. of Germany . |

OTHER PUBLICATIONS

Neuere Entwicklungen bei fotoelektrischen Langenmessgeraten, pp. 435–438, from Messen+prufen-/automatik Jul./Aug. 1974, by Dipl.-Ing. A. Ernst.

Primary Examiner—Willis Little
Attorney, Agent, or Firm—Willian Brinks Olds Hofer Gilson & Lione Ltd.

[57] ABSTRACT

A length measuring system for measuring or adjusting the relative position of two objects includes a housing for a scale. This housing is fastened to a mounting surface of one object by means of at least one clamping shoe which engages a groove in a side surface of the housing. The inside surface of the groove adjacent to the mounting surface encloses with the mounting surface an angle α measured in a plane perpendicular to the lengthwise extent of the housing. The clamping shoe abuts by means of appropriately situated projections the mounting surface, the side surface of the housing, and the inside surface of the groove. Thus, the mounting shoe applies a rotational torque to the housing. This torque is about an axis of rotation running the longitudinal extent of the housing. In this way, a whole surface engagement of the support surface of the housing against the mounting surface is provided, despite the fact that the clamping shoes are positioned on only one side of the housing.

9 Claims, 3 Drawing Figures

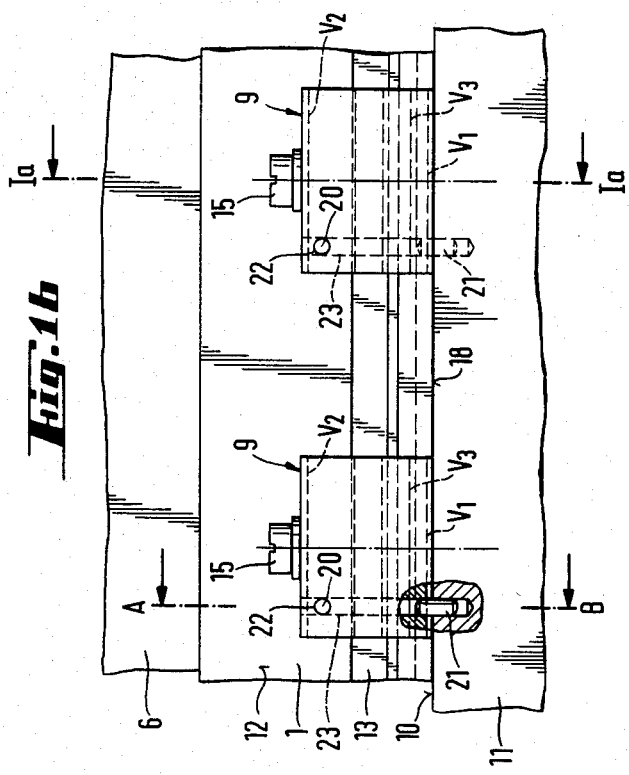
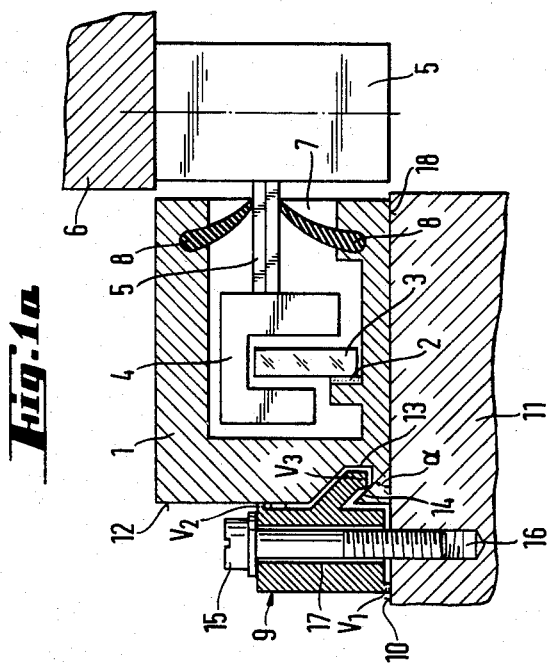

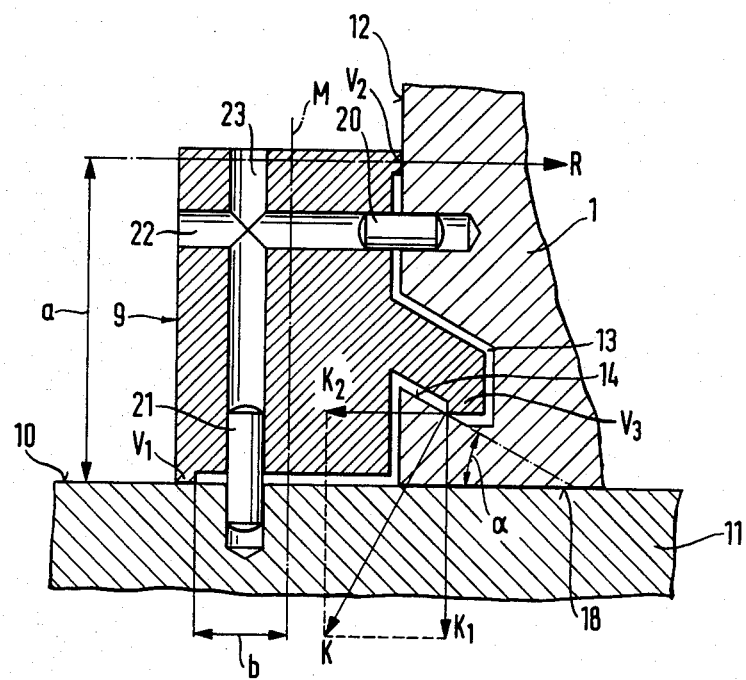

MOUNTING ARRANGEMENT FOR LENGTH MEASURING DEVICE

BACKGROUND OF THE INVENTION

The present invention relates to an improved mounting arrangement for a measuring device of the type comprising a measuring scale, a carrier which supports the measuring scale, and at least one clamping element for fasting the carrier to a mounting surface of one of two objects, the relative position of which is to be measured.

German Pat. No. 27 12 422 discloses a length measuring system which includes a housing that surrounds the measuring scale and the scanning unit. This housing is fastened by means of screws to a machine part.

German Pat. No. 25 05 585 discloses a length measuring system in which a housing, which encloses both the scale and the scanning unit, is fastened at both ends to a machine part by means of angle brackets which define in the vertex region a joint in the form of a groove.

German Pat. No. 26 30 880 discloses a length measuring system in which the housing, which encloses both the scale and the scanning unit, is fastened at both ends to an object to be measured by means of ball joints.

In the measuring systems described above, precisely positioned bores must be provided for the fastening of the housing to the object to be measured, both in the housing and also in the object. The formation of such precise bores represents a considerable expense in many applications.

The document "Messen und Prufen/Automatik", July and August 1974, page 438, FIG. 12a, discloses a known practice for fastening a scale to a narrow supporting surface of a machine part by means of clamping shoes positioned at one side of the scale. In this arrangement high contact pressure forces of the clamping shoes against the scale are needed to hold the scale carrier in engagement on the supporting surface in the face of vibrations and joltings of the machine.

German DE-OS No. 38 08 384 discloses a measuring arrangement in which a scale carrier defines on both side surfaces a lateral groove. Clamping shoes engage this lateral groove in order to fasten the scale carrier to a machine part. This arrangement provides a secure seating of the scale carrier on the machine part, but is relatively expensive in construction and requires considerable space to implement.

SUMMARY OF THE INVENTION

The present invention is directed to a length measuring device of the general type described above, and in particular to a simpler fastening arrangement for fastening the measuring scale carrier in place.

According to this invention, a lateral stop is provided along with at least one clamping shoe for mechanically clamping the carrier to the mounting surface. This clamping shoe comprises a first contacting surface which contacts a second contacting surface defined by the carrier. At least one of the first and second contacting surfaces is inclined with respect to the mounting surface such that the clamping shoe develops a contact force K having two force components $K_1$, $K_2$ perpendicular to one another in a plane perpendicular to the longitudinal direction. The force component $K_1$ operates to hold the carrier against the mounting surface, and the force component $K_2$ operates to hold the carrier against the lateral stop.

The present invention provides the important advantage that only one lateral groove is required in the preferred embodiment to fasten the carrier for the measuring scale in a simple and secure manner to the object to be measured. In this way, the number of clamping shoes required can be considerably reduced. As it will be apparent from the preferred embodiment described below, the present invention can be implemented in a particularly simple and economical manner to provide a particularly low-cost measuring system. Furthermore, the present invention can be implemented in systems which utilize very small space requirements in order to provide a measuring system which is flexibly usable. In the preferred embodiment described below the clamping shoe of this invention operates both as a fastening element and also as a lateral stop element to define the lateral position of the carrier of the measuring scale. Further advantageous features of the invention are set forth in the dependent claims attached hereto.

The invention itself, together with further objects and attendant advantages, will best be understood by reference of the following detailed description, taken in conjunction with the accompanying drawings.

BRIEF DESCRIPTION OF THE DRAWINGS

FIG. 1a is a cross-sectional view of an encapsulated length measuring system which incorporates a presently preferred embodiment of this invention.

FIG. 1b is a side view of a portion of the embodiment of FIG. 1b.

FIG. 2 is an enlarged sectional view taken along line a-b of FIG. 1b.

DETAILED DESCRIPTION OF THE PRESENTLY PREFERRED EMBODIMENTS

Turning now to the drawings, FIGS. 1a and 1b show a cross-sectional view and a side view respectively of an encapsulated length measuring system which incorporates a presently preferred embodiment of this invention. This length measuring system includes a housing 1 which in this embodiment takes the form of an extruded hollow profile formed of aluminum and serves as a carrier for a measuring scale 3. The measuring scale 3 is mounted to the housing 1 by means of an adhesive layer 2. The scale 3 defines a graduation which is scanned by a scanning unit 4 in a known manner for measuring the relative position of two objects. The scanning unit 4 is connected by means of a follower 5 with an object, the position of which is to be measured. In this embodiment, the object to be measured takes the form of a slide piece 6 of a processing machine (not shown). A longitudinal slit 7 runs the longitudinal extent of the housing 1, and the follower 5 passes through the slit 7. The slit 7 is closed by sealing lips 8 which are inclined toward one another in a roof-like manner to seal the interior of the housing 1 against contaminants. The follower 5 protrudes between the sealing lips 8 as shown in FIG. 1a.

The housing 1 is fastened by means of at least one clamping shoe 9 to a mounting surface 10 of the other object to be measured. In this preferred embodiment, this other object takes the form of the bed 11 of the processing machine. The housing 1 defines a side surface 12 oriented perpendicular to the mounting surface 10 of the bed 11, and this side surface 12 defines a lateral groove 13 which runs preferably over the entire length of the housing 1. The clamping shoe 9 is shaped to engage the lateral groove 13.

According to this invention, the groove 13 and the clamping shoe 9 are constructed in such a manner that the contact force K exerted by the clamping shoe 9 against the housing 1 is resolvable into two force components $K_1$, $K_2$, oriented perpendicular to one another in a plane perpendicular to the longitudinal extent of the housing 1. For this purpose, the inside surface 14 of the groove 13 adjacent to the mounting surface 10 is preferably inclined in an angle $\alpha$ with respect to the mounting surface 10 of the bed 11. This angle $\alpha$ lies in a range greater than zero degrees and less than 90 degrees and in this embodiment the surface 14 diverges from the mounting surface 10 in the direction of the mounting shoe 9. In this preferred embodiment the angle $\alpha$ is equal to 45°.

The clamping shoe 9 is fastened by means of a screw 15 to a threaded bore 16 in the mounting surface 10 of the bed 11. The clamping shoe 9 defines a first projection $V_1$ which abuts the mounting surface 10. In addition, the clamping shoe 9 defines a second projection $V_2$ which abuts the side surface 12 perpendicular to the mounting surface 10. Finally, the clamping shoe 9 defines a third projection $V_3$ which acts as a contacting surface to contact the inside surface 14 of the groove 13. The groove 13 is located between the projection $V_2$ and the mounting surface 10, and the screw 15 is located between the projection $V1_1$ and the side surface 12.

As shown in FIG. 2, the force K exerted by the projection $V_3$ of the clamping shoe 9 on the inside surface 14 of the groove 13 is resolvable into a first force component $K_1$ directed perpendicular to the mounting surface 10 and a second force component $K_2$ directly parallel to the mounting surface 10 towards the clamping shoe 9. In the fastening operation, by tightening the screw 15 of the clamping shoe 9, the force component $K_2$ brings the side surface 12 of the housing 1 into contact with the projection $V_2$ of the clamping shoe 9. Thus, the clamping shoe 9 acts as a lateral stop for the housing 1, which defines the lateral position of the housing 1 after the clamping shoe 9 has been securely tightened in place.

When the screw 15 is completely tightened in place, the projection $V_2$ exerts on the side surface 12 of the housing 1 a reaction force $R = -K_2$. This reaction force R acts through the lever arm A (A is the vertical distance between the projection $V_2$ and the mounting surface 10), and the housing 1 experiences a rotational torque equal to R·A about an axis of rotation running in the longitudinal direction of the housing 1 in the side surface 12 facing the clamping shoe 9, at the mounting surface 10. For this reason, the housing 1, despite the one-sided lateral engagement of the clamping shoe 9, is securely supported by the whole surface of the mounting surface 10. The distance A as well as the distance B (the separation of the projection $V_1$ from the center line M of the screw 15) of the clamping shoe 9 should be chosen to be as great as possible within the available dimensions of the clamping shoe 9.

The passage opening 17 in the clamping shoe 9 for the screw 15 is provided with a sufficient diameter to allow the screw 15 to wobble in the opening 17, so that no high precision requirements have to be made with respect to the position of the threaded bore 16 in the mounting surface 10 with respect to the desired position of the housing 1. The number and spacing of the clamping shoes 9 over the longitudinal extent of the housing 1 can be chosen as desired. In particular, in the case of a housing 1 with an uneven resting surface 18, the clamping shoes 9 can be arranged in such way that the uneven resting surface 18 obtains a whole surface contact with the mounting surface 10. The groove 13 does not need to extend over the entire length of the hollow profile 1, but can be partially formed in the hollow profile 1.

The measuring scale 3 which is fastened in the interior of the housing 1 by means of an adhesive layer 2 defines a fixed point at about its center position in response to thermal changes. This is because thermal length changes of the scale 3 occur symmetrically on both sides with respect to this center. As a further feature of this invention, which is particularly useful in some embodiments, this fixed central point of the scale 3 with respect to the housing 1 is made to correspond with the position of one of the clamping shoes 9. This shoe 9 is used to fixedly secure the housing 1 with respect to the object 11 to be measured at this same point. The contact forces of the additional clamping shoes 9 are adjusted in such a way that thermal length changes of the housing 1 are made possible symmetrically with respect to the fixed point of the housing 1. In this way, measuring inaccuracies as a result of temperature changes are largely avoided.

At this fixed point of the scale 3 and the housing 1, the clamping shoe 9 can be joined in a mechanically interlocked manner along the measuring direction with the housing 1. This mechanically interlocking connection can be provided for example by means of fitting pins 20, 21 which are positioned in bores 22, 23. The fitting pin 20 serves to interlock the clamping shoe 9 with the housing 1, and the pin 21 serves to interlock the clamping shoe 9 with the object 11 to be measured. The bores 22, 23 for the fitting pins 20, 21 are preferably formed after the clamping shoe 9 has been fastened in place. In a similar manner, a housing can be fixed at one end to an object to be measured if the scale has a fixed point on this end of the housing. Of course, it should be understood that the fixed point for the housing can also be established by means of a separate fastening element of any suitable type.

In a manner not shown in the drawings the housing may also define a lateral surface which is inclined with respect to the mounting surface in the direction towards the clamping shoe, so that the housing is pressed away from the clamping shoe when the clamping shoe is fastened in place. In this alternate embodiment a lateral stop is provided on the mounting surface on the side of the housing opposed to the side which engages the clamping shoes. The clamping shoe may have a correspondingly inclined surface to contact the inclined surface of the housing.

Of course, it should be understood that a range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a measuring apparatus for measuring the relative position of two objects, of the type comprising a measuring scale which extends along a longitudinal direction and a carrier which supports the measuring scale, the improvement comprising:

a lateral stop;

at least one clamping shoe for mechanically clamping the carrier to the mounting surface, said clamping shoe comprising a first contacting surface which contacts a second contacting surface defined by the carrier, at least one of the first and second contacting surfaces being inclined with respect to the mounting surface such that the clamping shoe develops a contact force K having two force components $K_1$, $K_2$ perpendicular to one another in a plane perpendicular to the longitudinal direction, the force component $K_1$ operating to hold the carrier against the mounting surface, the force component $K_2$ operating to hold the carrier against the lateral stop.

2. The invention of claim 1 wherein the lateral stop is defined by the clamping shoe; wherein the carrier defines a lateral groove sized to receive a portion of the clamping shoe; wherein the second clamping surface is defined by an inside surface of the groove adjacent to the mounting surface; wherein the second clamping surface is inclined at an angle $\alpha$ with respect to the mounting surface; and wherein the second clamping surface diverges from the mounting surface in the direction of the mounting shoe.

3. The invention of claim 1 wherein the carrier defines a side surface, perpendicular to the mounting surface, which defines a lateral groove sized to receive a portion of the clamping shoe; wherein the second clamping surface is defined by an inside surface of the groove; and wherein the clamping shoe is shaped to abut the mounting surface, the second clamping surface, and the side surface.

4. The invention of claim 2 wherein the lateral groove is defined in a side surface of the carrier perpendicular to the mounting surface; and wherein the clamping shoe is shaped to abut the mounting surface, the second clamping surface, and the side surface.

5. The invention of claim 2 wherein the angle $\alpha$ is within the range $0° < \alpha < 900°$.

6. The invention of claim 3 wherein the clamping shoe defines a first projection which abuts the mounting surface, a second projection which abuts the side surface, and a third projection which abuts the second contact surface.

7. The invention of claim 4 wherein the clamping shoe defines a first projection which abuts the mounting surface, a second projection which abuts the side surface, and a third projection which abuts the second contact surface.

8. The invention of claim 1 wherein the at least one clamping shoe is mechanically interlocked with the carrier and the mounting surface in order to fix the position of the carrier with respect to the mounting surface.

9. The invention of claim 8 wherein the clamping shoe is mechanically interlocked with the carrier and the mounting surface by at least one pin.

* * * * *